United States Patent
Ozeki et al.

(10) Patent No.: US 11,077,642 B2
(45) Date of Patent: Aug. 3, 2021

(54) HOT PRESS CUSHIONING MATERIAL

(71) Applicant: YAMAUCHI CORPORATION, Osaka (JP)

(72) Inventors: Takamitsu Ozeki, Osaka (JP); Akira Yoshida, Osaka (JP)

(73) Assignee: YAMAUCHI CORPORATION, Osaka (JP)

( * ) Notice: Subject to any disclaimer, the term of this patent is extended or adjusted under 35 U.S.C. 154(b) by 0 days.

(21) Appl. No.: 15/714,535

(22) Filed: Sep. 25, 2017

(65) Prior Publication Data
US 2018/0015690 A1   Jan. 18, 2018

Related U.S. Application Data

(63) Continuation of application No. 14/406,526, filed as application No. PCT/JP2013/068204 on Jul. 3, 2013, now abandoned.

(30) Foreign Application Priority Data

Aug. 17, 2012  (JP) .............................. JP2012-180927

(51) Int. Cl.
*B32B 5/26* (2006.01)
*D04H 1/4342* (2012.01)
(Continued)

(52) U.S. Cl.
CPC .............. *B32B 5/26* (2013.01); *B30B 15/061* (2013.01); *B32B 5/022* (2013.01); *B32B 5/06* (2013.01);
(Continued)

(58) Field of Classification Search
CPC ....... B32B 5/26; B32B 2250/20; B32B 5/022; B32B 2262/0269; B32B 2307/306;
(Continued)

(56) References Cited

U.S. PATENT DOCUMENTS 4,284,680 A    8/1981  Awano et al.
4,461,800 A *  7/1984  Tanaka .................. B30B 15/061
                                                          428/217

(Continued)

FOREIGN PATENT DOCUMENTS

EP    1084821 A2    3/2001
EP    1270193 A1    1/2003
(Continued)

OTHER PUBLICATIONS

Wikipedia, "Kevlar", Archived May 8, 2012, retrieved on Sep. 25, 2017 from http://web.archive.org/web/20120508120105/http://en.wikipedia.org/wiki/Kevlar, 8 Pages.
(Continued)

*Primary Examiner* — Jasper Saberi
(74) *Attorney, Agent, or Firm* — Ditthavong, Steiner & Mlotkowski

(57) ABSTRACT

A hot press cushioning material includes: a first nonwoven fabric forming an inner layer; and second nonwoven fabrics placed on both surfaces of the first nonwoven fabric and forming outer layers. Copolymerized para-aramid fibers having a basis weight of 80 to 400 g/m² are used as a material of the second nonwoven fabrics. Fibers that are more rigid than the copolymerized para-aramid fibers are used as a material of the first nonwoven fabric. Each of the first nonwoven fabric and the second nonwoven fabrics has a heat resistant temperature of 270° C. or more.

1 Claim, 1 Drawing Sheet

(51) Int. Cl.
  *D04H 1/4374* (2012.01)
  *D04H 1/498* (2012.01)
  *B30B 15/06* (2006.01)
  *B32B 5/06* (2006.01)
  *B32B 5/02* (2006.01)
  *B32B 7/02* (2019.01)
  *B29C 43/20* (2006.01)
  *B29C 43/36* (2006.01)

(52) U.S. Cl.
  CPC ............ *B32B 7/02* (2013.01); *D04H 1/4342* (2013.01); *D04H 1/4374* (2013.01); *D04H 1/498* (2013.01); *B29C 43/20* (2013.01); *B29C 2043/3657* (2013.01); *B32B 2250/03* (2013.01); *B32B 2250/20* (2013.01); *B32B 2262/0269* (2013.01); *B32B 2307/306* (2013.01); *B32B 2307/718* (2013.01); *B32B 2457/08* (2013.01); *B32B 2457/202* (2013.01); *Y10T 428/24942* (2015.01)

(58) Field of Classification Search
  CPC . B32B 2307/718; B32B 5/06; B32B 2250/03; B30B 15/061; D04H 1/4342; D04H 1/4334
  See application file for complete search history.

(56) References Cited

U.S. PATENT DOCUMENTS

| | | | |
|---|---|---|---|
| 5,614,280 A | | 3/1997 | Hanna |
| 5,691,036 A | * | 11/1997 | Lin .............. B32B 5/26 428/172 |
| 6,514,888 B1 | | 2/2003 | Tanaka et al. |
| 2004/0180185 A1 | * | 9/2004 | Fujimori .............. H05K 1/0366 428/297.4 |
| 2013/0075035 A1 | * | 3/2013 | Huang ................. D04H 1/46 156/306.3 |

FOREIGN PATENT DOCUMENTS

| | | |
|---|---|---|
| JP | 587646 A | 1/1983 |
| JP | 62156100 A | 7/1987 |
| JP | H0673688 A | 3/1994 |
| JP | H0691780 A | 4/1994 |
| JP | H06166935 A | 6/1994 |
| JP | H08169074 A | 7/1996 |
| JP | 2003145567 A | 5/2003 |
| JP | 2004243728 A | 9/2004 |
| JP | 2004330718 A | 11/2004 |
| JP | 2006161238 A | 6/2006 |
| JP | 2010137384 A | 6/2010 |
| JP | 2012062608 A | 3/2012 |
| JP | 2012111175 A | 6/2012 |
| KR | 20110040781 A | 4/2011 |
| WO | 2010007662 A1 | 1/2010 |
| WO | 2010007917 A1 | 1/2010 |

OTHER PUBLICATIONS

Teijin, "What is Aramid Fiber?", Feb. 1, 2001 retrieved on Jul. 1, 2015 from www.teijin.com/products/advanced_fibers/aramid/contents/aramid/aramid_fiber_e.htm, 2 Pages.
European Office Action for related European Patent Application No. 138794995-1303 dated Feb. 18, 2016, 7 Pages.
Hearle, "High-performance Fibres—Aramids", Woodhead Publishing, 2001, Online version available at: http://app.knovel.com/hotlink/pdf/id:kt003BGV59/high-performance-fibres/aramids, 44 Pages.
International Search Report for corresponding International Application No. PCT/JP2013/068204, dated Oct. 15, 2013, 2 pages.
Bunsell, "High-performance Fibers", Concise Encyclopedia of Composite Materials (2nd Edition), Dec. 8 , 2006, retrieved from app.knovel.com/hotli nk/pdf/id:ktOOU06CV1 /concise-encyclopedia/high -performance-fibers, pp. 426-436.

* cited by examiner

HOT PRESS CUSHIONING MATERIAL

RELATED APPLICATIONS

The present application is a continuation of application Ser. No. 14/406,526, filed on Dec. 8, 2014, which is a national stage entry of PCT/JP2013/068204, filed on Jul. 3, 2013, which claims priority to Japanese Patent Application No. JP 2012-180927, filed on Aug. 17, 2012, each of which is incorporated herein by their entirety.

TECHNICAL FIELD

The present invention relates to hot press cushioning materials for use in hot press, and more particularly to hot press cushioning materials that are used to press-form or thermocompression bond an intended product in a process of manufacturing a precision equipment part such as a printed circuit board like a copper-clad laminate, a flexible printed circuit board, or a multilayer board, an IC card, a liquid crystal display panel, or a ceramic laminate (hereinafter such a precision equipment part is referred to as the "laminate" in the present invention).

BACKGROUND ART

In the process of manufacturing a laminate, a compression body is first formed by stacking laminate materials as a material. The compression body is placed between heating platens, and is then hot-pressed, namely heated and pressed by a press, to join the laminate materials together by curing resin contained in the laminate materials via a fluidized state. If the heating platens or the compression body as a member that is placed therebetween has a non-uniform thickness, thermal strain, a non-uniform temperature, etc., the compression body that will be a product cannot be uniformly heated and pressed in the heating/pressing step. This results in a defective product with an undesirable thickness, cracking, or warping. As a solution to the undesirable thickness etc. of the product, a hot press cushioning material (hereinafter sometimes simply referred to as the "cushioning material") is used which has cushioning properties to uniformly heat and press the compression body by changing its shape according to the shape of the compression body during the press forming.

Techniques related to such a hot press cushioning material for use in hot press are disclosed in JP H06-91780 (Patent Literature 1) and H06-166935 (Patent Literature 2). Patent Literatures 1 and 2 disclose heat-resistant cushioning materials that are produced by forming cover layers by needling a web made of unstretched meta-aromatic polyamide fibers or a web containing meta-aromatic polyamide fibers, and performing a heat treatment at a temperature equal to or higher than the glass-transition point of the meta-aromatic polyamide fibers.

CITATION LIST

Patent Literatures

PTL 1: JP H06-91780
PTL 2: JP H06-166935

SUMMARY OF INVENTION

Technical Problem

Recently, higher thickness accuracy, reduction in thickness, etc. have been desired for laminates. According to such demanding needs for the laminates, improvement in characteristics is desired for hot press cushioning materials that are used to manufacture the laminates. That is, the hot press cushioning materials are desired to have heat resistance so that they can withstand use under high temperature conditions, to have high cushioning properties so that they maintain their cushioning properties even over long-term use under high temperature conditions, to achieve reduction in thermal degradation of the cushioning materials themselves, etc.

The hot press cushioning materials disclosed in Patent Literatures 1 and 2 may not be able to fulfill such needs. For example, if a hot press cushioning material using meta-aromatic polyamide fibers such as poly(m-phenyleneisophthalamide) is repeatedly used under high temperature conditions, problems such as generation of powder of the fibers or adhesion of the fibers to a compression body may occur due to thermal degradation of the hot press cushioning material. In such a state, at least it is difficult to use the hot press cushioning material as a cushioning material under high temperature conditions over a long period of time.

One solution to the problems such as generation of powder of the fibers or adhesion of the fibers to the compression body is to apply a so-called adhesive to a surface layer of the fibers forming the cushioning material to form an adhesive layer having a smooth surface on the surface layer of the fibers. However, the adhesive layer may be delaminated from the fibers when used in a high temperature environment that has been recently required, because the adhesive may not withstand use at high temperatures. That is, this solution is not appropriate.

It is an object of the present invention to provide a hot press cushioning material that has high cushioning properties even when used under high temperature conditions and that can be used over a long period of time.

Solution to Problem

The inventors took the recent demanding needs for cushioning materials into full account, and intensively studied fibers forming hot press cushioning materials for use in hot press. The inventor thus arrived at the idea of using a plurality of kinds of fibers having characteristics required for cushioning materials, and forming a cushioning material having a stacked structure of these fibers.

That is, a hot press cushioning material according to the present invention is a hot press cushioning material for use in hot press, including: a first nonwoven fabric forming an inner layer; and second nonwoven fabrics placed on both surfaces of the first nonwoven fabric and forming outer layers. Copolymerized para-aramid fibers having a basis weight of 80 to 400 g/m$^2$ are used as a material of the second nonwoven fabrics. Fibers that are more rigid than the copolymerized para-aramid fibers are used as a material of the first nonwoven fabric. Each of the first nonwoven fabric and the second nonwoven fabrics has a heat resistant temperature of 270° C. or more.

This hot press cushioning material has a stacked structure of the first nonwoven fabric forming the inner layer and the second nonwoven fabrics placed on both surfaces of the first nonwoven fabric and forming the outer layers, and each of the first nonwoven fabric and the second nonwoven fabrics has a function required for cushioning materials. The hot press cushioning material can thus satisfy the recent requirements for characteristics as cushioning materials.

That is, the second nonwoven fabrics are used as the outer layers forming surface layers, and the copolymerized para-aramid fibers having a basis weight of 80 to 400 g/m² are used as a material of the second nonwoven fabrics. This can eliminate generation of powder of the fibers or adhesion of the fibers even when used in a high temperature environment. Specifically, the fibers in each of the second nonwoven fabrics made of the copolymerized para-aramid fibers tend to be plastically deformed in initial press and are thus joined into an integrated film or a so-called film-like layer. Since the heat resistant temperature of the second nonwoven fabrics is 270° C. or more, generation of powder of the fibers of the film-like layer or adhesion of the fibers of the film-like layer can be eliminated even over long-term use under high temperature conditions. In this case, since the second nonwoven fabrics have a basis weight of 80 g/m² or more, requirements for characteristics as cushioning materials such as suppressed fluffing and tearing can be satisfied. The reason why the upper limit of the basis weight of the second nonwoven fabrics is set to 400 g/m² is that enhancement of the advantageous effects such as suppressed fluffing and tearing cannot be expected even if the basis weight of the second nonwoven fabrics is greater than 400 g/m².

The first nonwoven fabric is used as the inner layer, and the fibers that are more rigid than the copolymerized para-aramid fibers are used as a material of the first nonwoven fabric. The fibers of the first nonwoven fabric can therefore be less likely to be plastically deformed, and voids can be easily maintained inside the fiber body. Accordingly, high cushioning properties of the inner layer can be maintained. Since the heat resistant temperature of the first nonwoven fabric is also 270° C. or more, the first nonwoven fabric can withstand use at high temperatures. That is, no thermal decomposition of the fibers is caused even over long-term use under high temperature conditions. As used herein, the term "heat resistant temperature" means a melting point or thermal decomposition temperature of the fibers as a material of the nonwoven fabric.

Such a cushioning material thus has high cushioning properties even when used under high temperature conditions, and can be used over a long period of time.

The first nonwoven fabric and the second nonwoven fabrics may have been joined together by needle punch. The first nonwoven fabric and the second nonwoven fabrics can thus be more appropriately formed as a stacked structure body.

The copolymerized para-aramid fibers may include co-poly-(paraphenylene/3, 4-oxydiphenylene terephthalamide) fibers. The fibers that are more rigid than the copolymerized para-aramid fibers may include poly(p-phenylene terephthalamide) fibers.

Advantageous Effects of Invention

Such a hot press cushioning material has high cushioning properties even when used under high temperature conditions and can be used over a long period of time.

DESCRIPTION OF EMBODIMENTS

Figure 1:
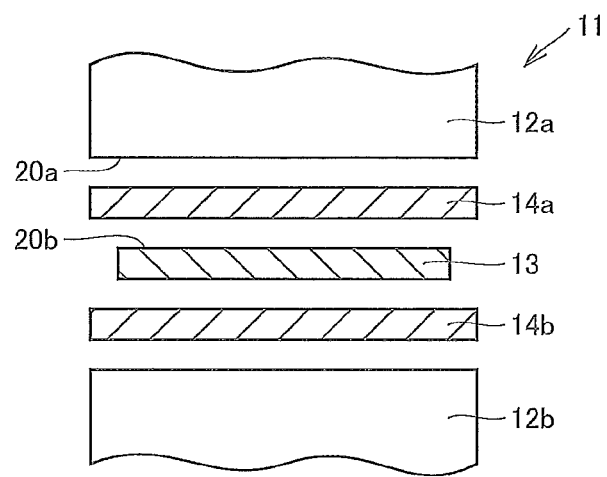
FIG. 1 is a schematic sectional view showing a hot press machine that is used to manufacture a laminate.

An embodiment of the present invention will be described below with reference to the accompanying drawings. FIG. 1 is a schematic sectional view showing a hot press machine that is used to manufacture a laminate. Referring to FIG. 1, a hot press machine 11 has two heating platens 12a, 12b that are arranged in the vertical direction so as to face each other. A manufacturing method of a laminate will be described. First, a compression body 13 formed by stacking a plurality of laminate materials as a material is prepared. Next, the compression body 13 is interposed between two hot press cushioning materials 14a, 14b having the same configuration. The hot press cushioning materials 14a, 14b having the compression body 13 interposed therebetween are placed between the heating platens 12a, 12b arranged in the vertical direction. That is, the hot press cushioning materials 14a, 14b are thus placed between the compression body 13 and the heating platens 12a, 12b, respectively. Press forming is performed by heating and pressing the compression body 13 with the heating platens 12a, 12b. A laminate as a product is thus manufactured. The compression body 13 is uniformly heated and pressed by the hot press cushioning materials 14a, 14b placed between the compression body 13 and the heating platens 12a, 12b.

Figure 2:
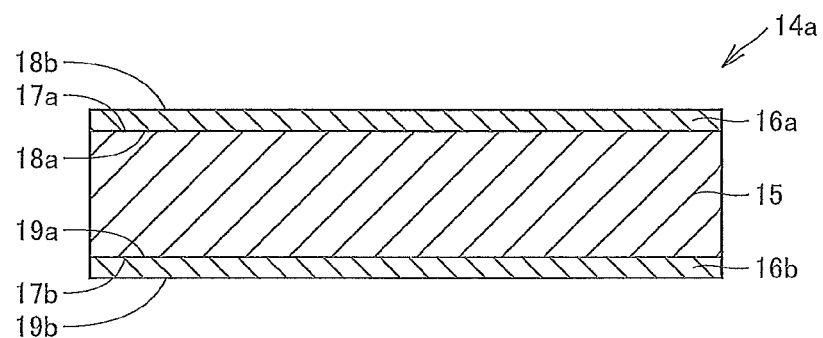
FIG. 2 is a schematic sectional view showing a hot press cushioning material according to an embodiment of the present invention taken along a thickness direction thereof.

The configuration of the hot press cushioning material 14a according to the embodiment of the present invention will be described below. Since the configuration of the hot press cushioning material 14b is the same as that of the hot press cushioning material 14a described below, description thereof will be omitted. FIG. 2 is a schematic sectional view showing the hot press cushioning material according to the embodiment of the present invention taken along a thickness direction thereof.

Referring to FIG. 2, the hot press cushioning material 14a according to the embodiment of the present invention is a hot press cushioning material for use in hot press, and includes a first nonwoven fabric 15 forming an inner layer, and second nonwoven fabrics 16a, 16b placed on both surfaces of the first nonwoven fabric 15 and forming outer layers.

Two second nonwoven fabrics 16a, 16b are provided. Specifically, an upper surface 17a of the first nonwoven fabric 15 in FIG. 2 contacts a lower surface 18a of one second nonwoven fabric 16a in FIG. 2, namely the upper second nonwoven fabric 16a in FIG. 2. A lower surface 17b of the first nonwoven fabric 15 in FIG. 2 contacts an upper surface 19a of the other second nonwoven fabric 16b in FIG. 2, namely the lower second nonwoven fabric 16b in FIG. 2. That is, the hot press cushioning material 14a has a single first nonwoven fabric 15 interposed between two second nonwoven fabrics 16a, 16b. The hot press cushioning material 14a is thus formed by a total of three nonwoven fabrics. An upper surface 18b of the one second nonwoven fabric 16a in FIG. 2 contacts a lower surface 20a of the heating platen 12a in FIG. 1 when hot press is performed. A lower surface 19b of the other second nonwoven fabric 16b in FIG. 2 contacts an upper surface 20b of the compression body 13 in FIG. 1 when hot press is performed.

Each of the first nonwoven fabric 15 and the second nonwoven fabrics 16a, 16b has a heat resistant temperature of 270° C. or more. That is, both the first nonwoven fabric 14 and the second nonwoven fabrics 16a, 16b are configured to have a heat resistant temperature of 270° C. or more. The first nonwoven fabric 15 and the second nonwoven fabrics 16a, 16b have been joined together by needle punch.

Copolymerized para-aramid fibers having a basis weight of 80 to 400 g/m² are used as a material of the second nonwoven fabrics 16a, 16b. Fibers that are more rigid than the copolymerized para-aramid fibers are used as a material of the first nonwoven fabric 15.

A specific example of the copolymerized para-aramid fibers forming the second nonwoven fabrics 16a, 16b is co-poly-(paraphenylene/3, 4-oxydiphenylene terephthalamide) fibers. The co-poly-(paraphenylene/3,4-oxydiphenylene terephthalamide) fibers are represented by the following structural formula (1).

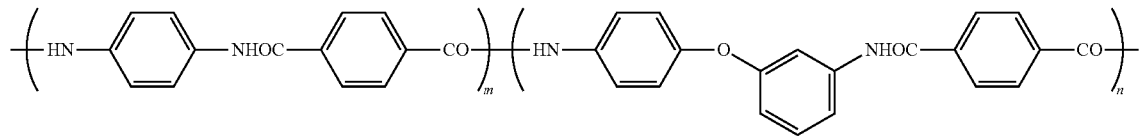

[Formula 1]

An example of the fibers that are more rigid than the copolymerized para-aramid fibers is poly(p-phenylene terephthalamide) (PPTA) fibers. The PPTA fibers are represented by the following structural formula (2).

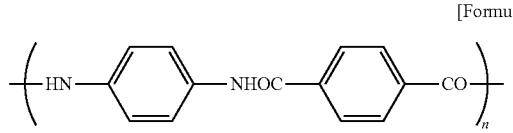

[Formula 2]

These hot press cushioning materials 14a, 14b have a stacked structure of the first nonwoven fabric 15 forming an inner layer and the second nonwoven fabrics 16a, 16b placed on both surfaces of the first nonwoven fabric 15 and forming outer layers, and each of the first nonwoven fabric 15 and the second nonwoven fabrics 16a, 16b has a function required for cushioning materials. The hot press cushioning materials 14a, 14b can thus satisfy the recent requirements for characteristics as cushioning materials.

That is, the second nonwoven fabrics 16a, 16b are used as the outer layers forming surface layers, and the copolymerized para-aramid fibers having a basis weight of 80 to 400 g/m² are used as a material of the second nonwoven fabrics 16a, 16b. This can eliminate generation of powder of the fibers or adhesion of the fibers even when used in a high temperature environment. Specifically, the fibers in each of the second nonwoven fabrics 16a, 16b made of the copolymerized para-aramid fibers tend to be plastically deformed in initial press and are thus joined into a so-called film-like layer. Since the heat resistant temperature of the second nonwoven fabrics 16a, 16b is 270° C. or more, generation of powder of the fibers of the film-like layer or adhesion of the fibers of the film-like layer can be eliminated even over long-term use under high temperature conditions. In this case, since the second nonwoven fabrics 16a, 16b have a basis weight of 80 g/m² or more, requirements for characteristics as cushioning materials such as suppressed fluffing and tearing can be satisfied. Enhancement of the advantageous effects such as suppressed fluffing and tearing cannot be expected even if the basis weight of the second nonwoven fabrics 16a, 16b is greater than 400 g/m².

The first nonwoven fabric 15 is used as the inner layer, and fibers that are more rigid than the copolymerized para-aramid fibers are used as a material of the first nonwoven fabric 15. The fibers of the first nonwoven fabric 15 can therefore be less likely to be plastically deformed, and voids can be easily maintained inside the fiber body. Accordingly, high cushioning properties of the inner layer can be maintained. Since the heat resistant temperature of the first nonwoven fabric 15 is also 270° C. or more, the first nonwoven fabric 15 can withstand use at high temperatures. That is, no thermal decomposition is caused even over long-term use under high temperature conditions.

Such hot press cushioning materials 14a, 14b thus have high cushioning properties even when used under high temperature conditions, and can be used over a long period of time.

In this case, since the second nonwoven fabrics 16a, 16b having the same configuration are placed on both surfaces, the orientation of the hot press cushioning materials 14a, 14b need not be considered when used as cushioning materials. That is, satisfactory workability can be achieved.

According to the above embodiment, the first nonwoven fabric 15 and the second nonwoven fabrics 16a, 16b are joined together by needle punch. However, the present invention is not limited to this, and the first nonwoven fabric 15 and the second nonwoven fabrics 16a, 16b may be joined together by other methods.

In the above embodiment, co-poly-(paraphenylene/3,4-oxydiphenylene terephthalamide) fibers are used as the copolymerized para-aramid fibers. However, the present invention is not limited to this, and other copolymerized para-aramid fibers may be used. PPTA fibers are used as the fibers that are more rigid than the copolymerized para-aramid fibers. However, the present invention is not limited to this, and other fibers may be used.

EXAMPLES

Example 1 was configured as follows. Two sheets of co-poly-(paraphenylene/3,4-oxydiphenylene terephthalamide) fibers (trade name "TECHNORA," made by Teijin Techno Products Limited) were used as the second nonwoven fabrics. These second nonwoven fabrics had a basis weight of 100 g/m². PPTA fibers (trade name "TWARON," made by Teijin Techno Products Limited) were used as the first nonwoven fabric. This first nonwoven fabric had a basis weight of 800 g/m². The second nonwoven fabrics were placed on both surfaces of the first nonwoven fabric, and were joined together by needle punch to produce a hot press cushioning material of Example 1 having an overall basis weight of 1,000 g/m².

As Comparative Example 1, a hot press cushioning material was produced by using a single sheet of nonwoven fabric of PPTA fibers (trade name "TWARON," made by Teijin Techno Products Limited) having a basis weight of 1,000 g/m².

As Comparative Example 2, a hot press cushioning material was produced by using a single sheet of nonwoven fabric of p-phenylene-2,6-benzobisoxazole (PBO) fibers (trade name "ZYLON," made by TOYOBO CO., LTD.) having a basis weight of 1,000 g/m².

As Comparative Example 3, a hot press cushioning material was produced by using a single sheet of nonwoven fabric of co-poly-(paraphenylene/3,4-oxydiphenylene terephthalamide) fibers (trade name "TECHNORA," made by Teijin Techno Products Limited) having a basis weight of 1,000 g/m$^2$.

A durability test was conducted for the hot press cushioning materials of Example 1 and Comparative Examples 1 to 3 by using hot press. Table 1 shows the result of the surface conditions of Example 1 and Comparative Examples 1 to 3 in the durability test. Table 2 shows the result of the cushioning properties of Example 1 and Comparative Examples 1 to 3 in the durability test.

TABLE 1

|  | Initial | Press one time | Press ten times | Press fifty times |
|---|---|---|---|---|
| Example 1 | ◯ | ◯ | ◯ | ◯ |
| Comparative Example 1 (Twaron Nonwoven Fabric) | ◯ | X (Coming-off of Fluff) | X (Coming-off of Fluff) | X (Coming-off of Fluff) |
| Comparative Example 2 (ZYLON Nonwoven Fabric) | ◯ | ◯ | X (Coming-off of Fluff) | X (Coming-off of Fluff) (Tearing) |
| Comparative Example 3 (Technora Nonwoven Fabric) | ◯ | ◯ | ◯ | ◯ |

TABLE 2

|  | Initial | Press one time | Press ten times | Press fifty times |
|---|---|---|---|---|
| Example 1 | 2824 | 628 | 336 | 276 |
| Comparative Example 1 (Twaron Nonwoven Fabric) | 2225 | 657 | 317 | 259 |
| Comparative Example 2 (ZYLON Nonwoven Fabric) | 2461 | 875 | 311 | 278 |
| Comparative Example 3 (Technora Nonwoven Fabric) | 2282 | 206 | 132 | 114 |

Hot press was performed with Example 1 and Comparative Examples 1 to 3 in Tables 1 and 2 at a temperature of 300° C. and a pressure of 10 MPa. One press cycle consisted of heating for 110 minutes and cooling for 15 minutes. In the tables, "10 times" means that measurement was carried out after hot press was performed ten times.

The symbol "◯" in Table 1 means a satisfactory surface condition. That is, the symbol "◯" means that neither coming-off of fluff nor tearing occurred. The symbol "x" in Table 1 means a poor surface condition. That is, the symbol "x" means that either coming-off of fluff or tearing or both of them occurred.

Referring to Table 1, in Example 1 and Comparative Example 3, neither coming-off of fluff nor tearing had occurred even after hot press was performed one, ten, and fifty times from the initial state. This shows that Example 1 and Comparative Example 3 had a satisfactory surface condition. On the other hand, in Comparative Example 1, coming-off of fluff had already occurred after hot press was performed one time, and fluffing occurred in the subsequent hot presses. In Comparative Example 2, coming-off of fluff had occurred after hot press was performed ten times, and also after hot press was performed fifty times. In Comparative Example 2, tearing had also occurred after hot press was performed fifty times. Coming-off of fluff and tearing taint the production line of laminates, and the matter that came off from the nonwoven fabrics adversely affects laminate products as objects to be hot-pressed if caught in the laminate products. This shows that Comparative Examples 1 and 2 are inferior to Example 1 in terms of the surface condition.

Table 2 shows how much the thickness of each hot press cushioning material changed from before pressing, in the case where the hot press cushioning material in the initial state and the hot press cushioning materials with which hot press had been performed predetermined numbers of times were pressed with a load of 10 MPa. The amount of change in thickness was used as an evaluation index of the cushioning properties. The thickness was measured with a dial gauge. Table 2 shows the initial thickness of each hot press cushioning material.

Referring to Table 2, in Example 1, the amount of change in thickness was 2,824 μm in the hot press cushioning material in the initial state, but was 628 μm in the case where hot press had been performed one time. The amount of change in thickness decreases as the number of times hot press had been performed increases. The amount of change in thickness was 336 μm in the case where hot press had been performed ten times, and was 276 μm even in the case where hot press had been performed fifty times. In Example 1, the amount of change in thickness thus has a relatively large value in each situation. The larger the amount of change in thickness is, the more satisfactory the cushioning properties are. That is, it is more desirable that the hot press cushioning material have a larger amount of change in thickness even if hot press has been performed.

On the other hand, in Comparative Example 3, the amount of change in thickness was 2,282 μm in the hot press cushioning material in the initial state, but was 206 μm in the case where hot press had been performed one time, which shows significant degradation in cushioning properties. The amount of change in thickness decreases as the number of times hot press had been performed increases. The amount of change in thickness was 132 μm in the case where hot press had been performed ten times, and was 114 μm in the case where hot press had been performed fifty times, which means very poor cushioning properties. This shows that Comparative Example 3 is inferior to Example 1 in terms of the cushioning properties.

In Comparative Example 1, the amount of change in thickness was 2,225 μm in the hot press cushioning material in the initial state, but was 657 μm in the case where hot press had been performed one time. The amount of change in thickness was 317 μm in the case where hot press had been performed ten times, and was 259 μm even in the case where hot press had been performed fifty times. In Comparative Example 1, the amount of change in thickness thus has a large value in each situation. In Comparative Example 2, the amount of change in thickness was 2,461 μm in the hot press cushioning material in the initial state, but was 875 μm in the case where hot press had been performed one time. The amount of change in thickness was 311 μm in the case where hot press had been performed ten times, and was 278 μm even in the case where hot press had been performed fifty times. In Comparative Example 2, the amount of change in thickness thus has a large value in each situation. As described above, although Comparative Examples 1 and 2 have satisfactory cushioning properties, it is difficult to use Comparative Examples 1 and 2 in view of the surface condition.

The above shows that Example 1 is satisfactory as compared to Comparative Examples 1 to 3 in view of both the cushioning properties and the surface condition.

Although the embodiment of the present invention is described above with reference to the drawings, the present invention is not limited to the illustrated embodiment. Various modifications and variations can be made to the illustrated embodiment within a scope that is the same as, or equivalent to, that of the present invention.

INDUSTRIAL APPLICABILITY

The hot press cushioning material according to the present invention is effectively used in the case where satisfactory productivity etc. of laminates is required.

REFERENCE SIGNS LIST 11 hot press machine
12a, 12b heating platen
13 compression body
14a, 14b hot press cushioning material
15 first nonwoven fabric
16a, 16b second nonwoven fabric
17a, 17b, 18a, 18b, 19a, 19b, 20a, 20b surface

The invention claimed is:

1. A hot press cushioning material for a hot press, comprising:
a first nonwoven fabric forming an inner layer; and
second nonwoven fabrics needle punched to both surfaces of said first nonwoven fabric and forming surface layers, wherein:
each second nonwoven fabric having an inner surface facing the first nonwoven fabric and an outer surface, and the outer surfaces of the second nonwoven fabrics are substantially planar,
said first nonwoven fabric including poly-(p-phenylene terephthalamide) fiber as a material of said first nonwoven fabric,
said second nonwoven fabrics including co-poly-(paraphenylene/3,4'-oxydiphenylene terephthalamide) fiber as a material of said second nonwoven fabrics, having a basis weight of 80 to 400 $g/m^2$,
said first nonwoven fabric and said second nonwoven fabric have a heat resistant temperature of 270° C. or more,
a rigidity of the first nonwoven fabric is greater than a rigidity of said second nonwoven fabric, and
a basis weight of the first nonwoven fabric is larger than the basis weight of the second nonwoven fabrics.

* * * * *